United States Patent Office 3,467,963
Patented Sept. 16, 1969

3,467,963
MONOPULSE RADAR APPARATUSES
Yftinus Frederik van Popta, Hengelo, Netherlands, assignor to N.V. Hollandse Signaalapparaten, Hengelo, Overijsel, Netherlands, a firm of the Netherlands
Filed Nov. 27, 1967, Ser. No. 685,987
Int. Cl. G01s 9/02
U.S. Cl. 343—16      6 Claims

ABSTRACT OF THE DISCLOSURE

A monopulse radar system in which intermediate frequency signals corresponding to echo signals from at least two receiving patterns are coherently detected to produce audio signals proportional to Doppler shift due to target movement. The audio signals are compared to produce an error signal for controlling a tracking circuit.

---

Figure 1:
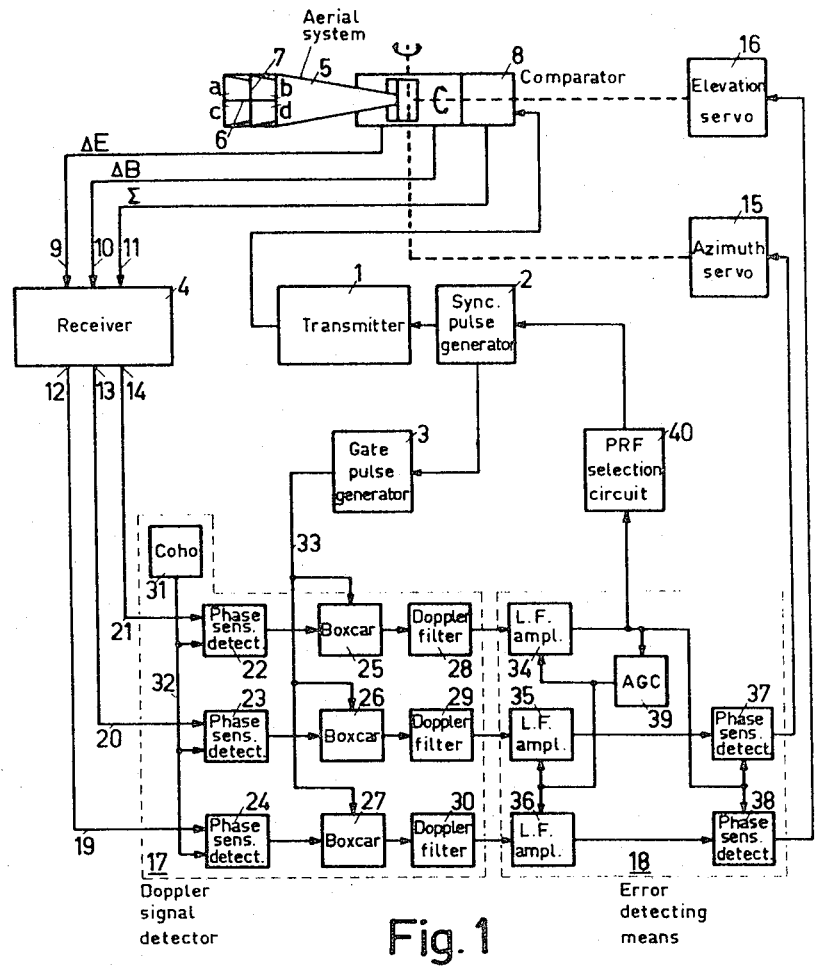

The invention relates to a monopulse radar apparatus for the automatic angle tracking of a moving target.

Such monopulse tracking radars may be realized in various ways; cf. Rhodes: "Introduction to Monopulse," McGraw-Hill, particularly FIG. 3.12 and the associated text of pages 56 and 57, from which it may be derived that the various forms of such a monopulse radar apparatus all satisfy one and the same special theory. The various forms correspond to each other as regards structure and principle, in that they comprise a transmitter for transmitting pulses of micro wave energy, a receiver for the reception of echo signals in at least two receiving patterns located symmetrically with respect to the bore sight axis and for each angle co-ordinate a tracking circuit controlled by an error signal whose magnitude and sign depend upon the amplitude and/or phase relationship of at least two intermediate-frequency signals varying in accordance with the target deviation with respect to said bore sight axis, said signals being supplied by the receiver at the reception of the echo signals. The error signal is simply derived from the intermediate-frequency signals by combining the latter in the correct manner in an error detector, which supplies an output signal whose magnitude and sign are proportional to the magnitude and the direction of the angular deviation of the target from the bore sight axis.

Tracking a target by means of such a known monopulse radar apparatus is, however, often seriously impeded or even completely prevented due to the simultaneous reception of undesired echo signals of the type generally referred to as "clutter." These are the echos due to ground or sea reflections and also those occurring as a result of certain meteorological conditions, for example, the echos from clouds or rain. Clutter echos are particularly interfering in that they are often so much stronger than the echo of the target that they completely obscure the latter. For moving targets this is inevitably accompanied by a loss of target, as the response of the tracking circuits under these circumstances will cause the radar to lock on the clutter. This difficulty has been regarded for a long time as a serious drawback of the known monopulse radar apparatus, since it is usually not possible to track low flying targets.

The invention has for its object to provide a monopulse radar apparatus in which the aforesaid drawback is reduced to a considerable extent.

According to the invention a monopulse radar apparatus of the kind set forth is constructed in a manner such that the angle error signal required for controlling the tracking circuit is derived from audio signals obtained by coherent detection of the intermediate-frequency signals, said audio signals being proportional to the Doppler shift of the echo signals due to the movement of the target. The invention is based on the one hand on the recognition of the fact that Doppler M.T.I. (moving target indication) the coherent-detection assessment of the presence or the absence of a Doppler signal provides a means for discriminating between echos of moving targets and stationary targets and on the other hand on the novel recognition of the fact that with monopulse radar the desired angle information even after such a coherent detection remains unaltered in the resultant audio signals so that the required error signal can be derived from these audio signals.

Figure 2A:
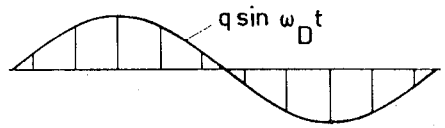
Figure 2B:
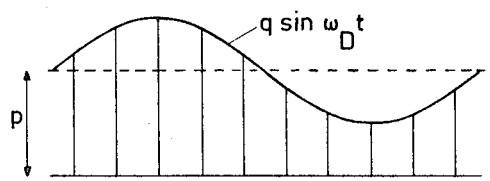
Figure 3:
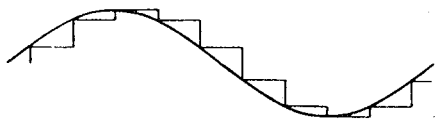

The invention and its advantages will now be described more fully with reference to the accompanying figures of which FIG. 1 shows a block diagram of a possible embodiment of a monopulse radar apparatus according to the invention, and FIGS. 2a, 2b and FIG. 3 illustrate three curves for explaining the operation.

FIG. 1 shows the block diagram of a monopulse radar apparatus for tracking a moving target in two angle co-ordinates. This radar apparatus comprises a transmitter 1, a synchronizing pulse generator 2, a gate pulse generator 3 and a receiver 4. The transmitter and the receiver are connected to an aerial system 5. Through this aerial system the microwave energy generated by the transmitter is pulsed in the rhythm of the synchronizing pulses supplied by the generator 2. The monopulse radar apparatus shown in FIG. 1 is of the sum and difference type. In accordance herewith the aerial system 5, shown diagrammatically, comprises a horn divided into four portions by septums 6 and 7. A device 8, frequently termed "comparator," operates to compare on the one hand the amplitudes of the microwave energies received above and below septum 6 and on the other hand the amplitudes of the microwave energies received on either side of septum 7. Thus, assuming the respective magnitudes of microwave energy at the four horn portions to be $a$, $b$, $c$ and $d$, the comparator device 8 produces an elevation difference signal and an azimuth difference signal whose respective amplitudes may be represented by:

$$\Delta E = (a+b)-(c+d)$$

and $$\Delta B = (a+c)-(b+d)$$

Comparator 8 additionally produces a microwave signal which is proportional to the sum of the microwave energies received in the four portions of the horn. The amplitude of this sum signal may be represented by:

$$\Sigma = (a+b+c+d)$$

Considering the target as a point target, the signals $a$, $b$, $c$ and $d$ received in said horn portions are of equal phase so that each one of the difference signals may either be in co-phase or in opposite phase with respect to the sum signal. From this phase information the sign of the target deviation may be derived. If, for example, the difference signal $\Delta E$ is in co-phase with respect to the sum signal $\Sigma$, that is to say: $(a+b) > (c+d)$, it follows that the position of the target is above the bore sight axis, whereas, if the difference signal $\Delta E$ is in opposite phase with respect to the sum signal, that is to say:

$$(a+b) < (c+d)$$

the position of the target is below the bore sight axis. The difference signal $\Delta B$ may be considered similarly, to obtain the sign of the deviation in azimuth.

Through wave guides 9, 10 and 11 the microwave signals $\Delta E$, $\Delta B$ and $\Sigma$ are fed to the receiver 4. In this receiver the two difference signals $\Delta E$ and $\Delta B$ and the sum signal $\Sigma$ are amplified and normalized after first having been converted to a prescribed intermediate frequency. The normalisation has for effect that fluctuations as caused by variations of the target distance or of the reflecting target surface are eliminated so that the amplitude ratios $\Delta E/\Sigma$ and $\Delta B/\Sigma$, provide a true measure of the magnitude of the target deviation from the bore sight axis. The I.F. output signals $\Delta E_{IF}$, $\Delta B_{IF}$ and $\Sigma_{IF}$ occur at the receiver outputs 12, 13 and 14 respectively. As may be noted from the foregoing explications they contain an amplitude and a phase information which is a measure of the magnitude and the direction of the target deviation from the bore sight axis. These I.F. signals, therefore, may be utilized to develop the control voltages or error signals required for the actuation of azimuth and elevation tracking servos 15 and 16.

According to the invention a particularly advantageous and effective radar apparatus is obtained by deriving the angular error signals required for controlling the tracking servos 15 and 16 from audio-frequency signals obtained by coherent detection of the said I.F. signals, said audio signals being proportional to the Doppler-shift of the echo signals as caused by the movement of the target.

For this purpose the monopulse radar apparatus according to the invention comprises a plurality of Doppler signal detectors 17, in which the I.F. output signals of the receiver 4 are subjected to the said coherent detection, with the use of a reference signal which is a replica of the transmitter frequency transformed to the intermediate frequency, whereby the Doppler signals produced by the movement of the target and imposed on the I.F. signals are obtained with true amplitude and phase.

From the figure it will be apparent that the I.F. signals appearing at the receiver outputs 12, 13 and 14 are applied through the conductors 19, 20 and 21 respectively to the Doppler signal detectors 17. In this embodiment said Doppler signal detectors comprise each in order of succession a phase-sensitive detector 22, 23 and 24 respectively, to which the relevant I.F. signal and the said reference signal are applied, a boxcar detector 25, 26 and 27 respectively for stretching the output pulses of said phase-sensitive detector, and connected to the output of said boxcar detector a Doppler filter 28, 29 and 30 respectively providing the audio-frequency output signal.

Assuming the incoming echo signals to be free of simultaneously received clutter echos, the I.F. signals appearing at the receiver outputs 12, 13 and 14 may be represented by:

$$\Delta E_{IF} = \{(a+b)-(c+d)\}_{tg} \sin(\omega_i \pm \omega_D)t$$
$$\Delta B_{IF} = \{(a+c)-(b+d)\}_{tg} \sin(\omega_i \pm \omega_D)t \text{ and}$$
$$\Sigma_{IF} = (a+b+c+d)_{tg} \sin(\omega_i \pm \omega_D)t$$

where $\omega_i = 2\pi f_i$; $f_i$ = intermediate frequency
$\omega_D = 2\pi f_D$; $f_D$ = Doppler frequency
Index $tg$ means "target."

Of the aforesaid I.F. signals, the I.F. sum signal $\Sigma_{IF}$ is applied to the phase-sensitive detector 22, whereas the I.F. difference signals $\Delta B_{IF}$ and $\Delta E_{IF}$ are applied to the phase-sensitive detectors 23 and 24 respectively. The reference signal applied to each one of these detectors is produced by means of a coherent oscillator 31. This coherent oscillator supplies via line 32 an output signal which is a replica of the transmitter frequency though transformed to said intermediate frequency. This reference signal may be represented by:

$$R \sin \omega_i t$$

Said phase-sensitive detectors 22, 23 and 24 operate on these applied signals to produce each of them an output signal consisting of bipolar video pulses modulated in amplitude in accordance with the audio-frequency signal $\omega_D$. Mathematically the envelopes of these output signals may be represented by:

$$\Sigma_D = (a+b+c+d)_{tg} \sin \omega_D t$$
$$\Delta B_D = \{(a+c)-(b+d)\}_{tg} \sin \omega_D t$$
$$\Delta E_D = \{(a+b)-(c+d)\}_{tg} \sin \omega_D t$$

These equations have the general form $q \sin \omega_D t$, from which it follows that each of these signals has an envelope consisting of a sine wave of audio frequency $\omega_D$, the amplitude $q$ of which is determined by the target echo. FIG. 2a illustrates such a envelope signal. From the above equations it may be derived that the amplitude and phase information required for automatic tracking and contained as stated above in the I.F. signals even after the coherent detection of these I.F. signals remains unaltered in the resultant audio-frequency signals. The signal envelopes therefore contain all information required for producing the angular error signals.

If it is now assumed that the received signals consist of target echos and simultaneously received clutter echos, the I.F. difference signals and the I.F. sum signal consist of a mixture of Doppler shifted and non-Doppler-shifted components, as the target being tracked is a moving target, whereas the objects that cause the clutter echos, apart from internal clutter motion, if any, are stationary or substantially stationary. Mathematically these I.F. signals may be represented by:

$$\Delta B_{IF} = \{(a+c)-(b+d)\}_{cl} \sin \omega_i t$$
$$+ \{(a+c)-(b+d)\}_{tg} \sin(\omega_i \pm \omega_D)t$$
$$\Delta E_{IF} = \{(a+b)-(c+d)\}_{cl} \sin \omega_i t$$
$$+ \{(a+b)-(c+d)\}_{tg} \sin(\omega_i \pm \omega_D)t$$
$$\Sigma_{IF} = (a+b+c+d)_{cl} \sin \omega_i t$$
$$+ (a+b+c+d)_{tg} \sin(\omega_i \pm \omega_D)t$$

Coherent detection of these I.F. signals in the phase-sensitive detectors 22, 23 and 24 with said signal $R \sin \omega_i t$ as a reference signal produces at the output of each one of these detectors pulses of constant amplitude with superimposed on each one of these pulses a bipolar video pulse, said video pulses varying in amplitude in accordance with the audio-frequency signal $\omega_D$. Mathematically the envelopes of these output signals may be represented by:

$$\Sigma_D = (a+b+c+d)_{cl} + (a+b+c+d)_{tg} \sin \omega_D t$$
$$\Delta B_D = \{(a+c)-(b+d)\}_{cl} + \{(a+c)-(b+d)\}_{tg} \sin \omega_D t$$

and $$\Delta E_D = \{(a+b)-(c+d)\}_{cl} + \{(a+b)-(c+d)\}_{tg} \sin \omega_D t$$

Since the general form of these equations is equal to: $p + q \sin \omega_D t$ they may be illustrated by the curve shown in FIG. 2b. The first term in each one of these equations represents a D.C.-voltage the magnitude $p$ of which is dependent on the received clutter echo, the second term represents a sine wave of audio frequency $\omega_D$ and having an amplitude $q$, which is dependent on the target echo. Thus, apparently here, too, the envelope signals contain the amplitude and phase information required for producing the desired angular error signals.

Tests carried out on a monopulse radar apparatus according to the invention have proven that the audio-frequency signal envelopes invariably contain the amplitude and phase information required to produce the desired angular error signals no matter whether or not the target echo is free of clutter. These signal envelopes are reconstructed by feeding the video pulses at the outputs of the respective phase-sensitive detectors 22, 23 and 24 to the associated boxcar circuits 25, 26 and 27 which function in a manner to stretch the video pulses from one repetition period to the next.

As is well-known the boxcar circuit clamps the potential of a storage element, such as a capacitor to the video pulse amplitude each time the pulse is received. Between pulses, the storage element maintains the potential of the preceding pulse and is altered only when a new video pulse is produced whose amplitude differs from that of the previous one. The figure shows that through line 33 a range gate pulse is applied to the boxcar circuits for selecting a given video signal. The range gate pulses are produced by the gate pulse generator 3, which forms part of an automatic range tracking circuit. This circuit is not shown in the figure and is left out of consideration, since the range tracking facility does not lie within the scope of the present invention.

The output signal of each one of the boxcar circuits may be represented by the stepped curve of FIG. 3. This output signal is, in effect, a reconstruction of the envelope of the modulated pulses. Besides furnishing a large audio amplification, the boxcar circuits have a filter action causing a substantial suppression of the pulse repetition frequency and its harmonics. As shown, the output of each one of the boxcar circuits is applied to an associated one of the Doppler filters 28, 29 and 30. These Doppler filters act as a smoothing device for the desired envelope or Doppler signal. With a view to the variations of the Doppler signal frequency emanating from changes in radial velocity of the target being tracked, the pass-band of these Doppler filters is chosen to be relatively wide, for example half the pulse repetition frequency.

In order to determine the angular error signals the output signals of the Doppler filters 28, 29 and 30 are applied through low-frequency linear amplifiers 34, 35 and 36 to the error detecting means 18. In the error detecting means 18 the output signals of the L.F. amplifiers 35 and 36 as represented by the equations:

$$\Delta B_D = \{(a+c)-(b+d)\}_{tg} \sin \omega_D t$$

and $$\Delta E_D = \{(a+b)-(c+d)\}_{tg} \sin \omega_D t$$

are applied, the one to a phase-sensitive detector 37 and the other to a phase-sensitive detector 38. Moreover, these phase-sensitive detectors receive as a reference signal the output signal of the L.F. amplifier 34, as expressed by $$\Sigma_D = (a+b+c+d)_{tg} \sin \omega_D t$$

The phase-sensitive detectors 37 and 38 operate on the applied signals to produce the desired angular error signals; phase-sensitive detector 37 producing the azimuth error signal, the magnitude and sign of which are determined by:

$$\frac{(a+c)-(b+d)}{(a+b+c+d)}$$

whilst phase-sensitive detector 38 produces the elevation error signal, the magnitude and sign of which are determined by:

$$\frac{(a+b)-(c+d)}{(a+b+c+d)}$$

It may be observed that the amplitude of the envelope signal at the outputs of the Doppler filters may vary due to the action of the automatic gain control system as included in the I.F. stages of the receiver for normalizing the I.F. signals. Such variations of the envelope signals must, of course, be avoided, since they have a direct effect on the gradient of the angular error signals. Therefore, as a further expedient, the low-frequency linear amplifiers 34, 35 and 36 are provided with an automatic gain control system 39, which is connected to the output of the low-frequency linear amplifier 34.

In view of the possible occurrence of the so-called "blind speeds," a phenomenon inherent to Doppler signal detection, the system is further provided with a PRF selection circuit 40, which, in response to the audio-frequency output of linear amplifier 35 produces an output signal which controls the synchronizing pulse generator 2 to effect a change in PRF any time the Doppler frequency approaches a value corresponding to a target blind speed.

Instead of using phase-sensitive detectors 22, 23 and 24, mixing stages and filters may be employed for filtering out the desired single-sideband signals.

Apart from this modification the application of the measures according to the invention is not at all restricted to the amplitude-comparison method of monopulse radar. By those skilled in the art it will be understood that these measures may also be applied to other known forms of monopulse tracking radar, for example those based on phase comparison or amplitude-phase comparison, and those of the so-called "track-while-scan" type.

What we claim is:

1. A monopulse radar system for automatic angle tracking of a moving target among clutter targets, comprising an antenna system, a transmitter connected to said antenna system for transmitting pulses of microwave energy, receiver means connected to said antenna system for receiving echo signals in first and second receiving patterns which are symmetric with respect to the bore sight axis of said antenna system, said receiving means comprising means for producing first and second intermediate frequency signals from the echo signals of said first and second patterns respectively, means for coherently detecting said first and second intermediate frequency signals to produce first and second audio frequency signals proportional to the Doppler shift of said echo signals due to movement of said target and to produce a direct current from echo signals from clutter targets, error signal producing means connected to compare said first and second audio frequency signals to produce an error signal which depends in amplitude and sign upon a characteristic of said first and second intermediate frequency signals which varies with target deviation from said bore sight axis and to reject said direct current from clutter targets, tracking circuit means, and means applying said error signal to said tracking circuit means.

2. A monopulse radar apparatus a sclaimed in claim 1, wherein the separate intermediate-frequency outputs of the receiver are each connected to an associated Doppler signal detector, in which the relevant I.F. output signal of the receiver is subjected to said coherent detection with the use of a reference signal which is a true replica of the transmitter frequency transformed to the intermediate-frequency, whereby the Doppler signals produced by the movement of the target and superimposed on the I.F. signals are obtained with true phase and amplitude.

3. A monopulse radar apparatus as claimed in claim 2, wherein each of the Doppler signal detectors comprises in order of succession a phase-sensitive detector to which the relevant I.F. signal of the receiver and said reference signal are applied, a boxcar detector for stretching the output pulses of the phase-sensitive detector and connected to the boxcar detector output a Doppler filter providing the audio-frequency output signal.

4. A monopulse radar apparatus as claimed in claim 3, wherein said Doppler filter has a bandwidth in the order of magnitude of half the pulse repetition frequency.

5. A monopulse radar apparatus as claimed in claim 1, wherein said error signal is derived from said audio-frequency signals by using an error detector to which the two audio-frequency signals are applied as input signals.

6. A monopulse radar apparatus as claimed in claim 5, wherein said error detector comprises a phase-sensitive detector and to which the relevant audio-frequency signals are applied through low-frequency linear amplifiers, whereby one of said applied audio-frequency signals operates as a reference signal.

References Cited

UNITED STATES PATENTS

| | | | |
|---|---|---|---|
| 2,934,757 | 4/1960 | Hoefer et al. | 343—16 |
| 2,988,739 | 6/1961 | Hoefer et al. | 343—16 |
| 3,176,295 | 3/1965 | Kirkpatrick et al. | 343—16 |
| 3,178,711 | 4/1965 | Case | 343—16 |

RODNEY D. BENNETT, Jr., Primary Examiner

JEFFREY P. MORRIS, Assistant Examiner